April 22, 1958     I. H. CULVER     2,831,391
HIGH SPEED CAMERA
Filed Dec. 30, 1954     3 Sheets-Sheet 1
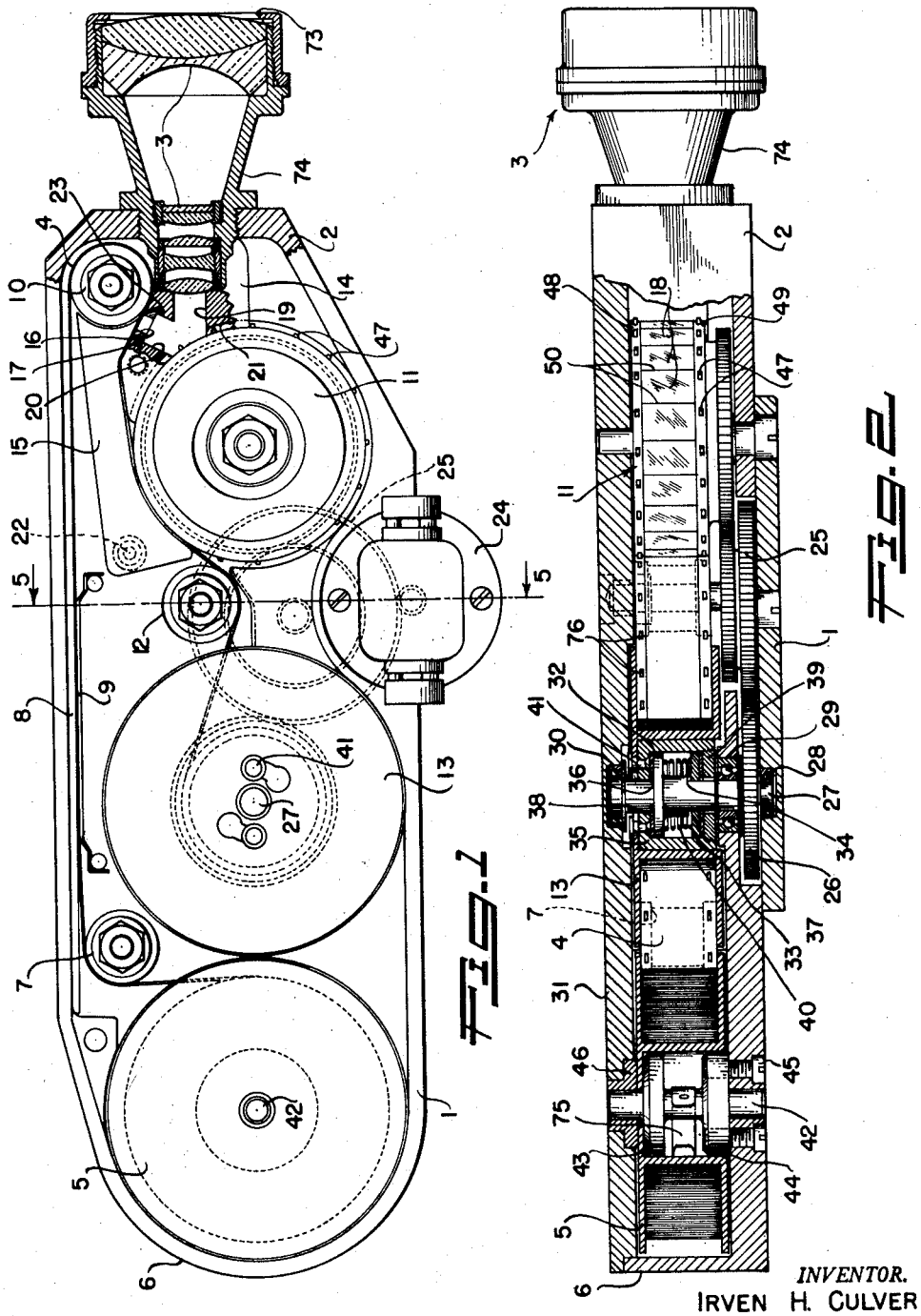
INVENTOR.
IRVEN H. CULVER
BY
Agent April 22, 1958     I. H. CULVER     2,831,391
HIGH SPEED CAMERA Filed Dec. 30, 1954     3 Sheets-Sheet 2

INVENTOR.
IRVEN H. CULVER
BY
George A. Sullivan
Agent

April 22, 1958

I. H. CULVER 2,831,391

HIGH SPEED CAMERA

Filed Dec. 30, 1954

INVENTOR.
IRVEN H. CULVER

BY

*George C. Sullivan*

Agent

United States Patent Office 2,831,391
Patented Apr. 22, 1958

2,831,391

HIGH SPEED CAMERA

Irven H. Culver, La Canada, Calif., assignor to Lockheed Aircraft Corporation, Burbank, Calif.

Application December 30, 1954, Serial No. 478,767

2 Claims. (Cl. 88—16.8)

This invention relates, in general, to cameras, and, more particularly, to a high speed motion picture camera wherein an image is projected onto a continuously moving film by means of a series of reflectors forming a part of the film moving sprocket wheel, the image moving at the same speed as the film and each reflector exposing one frame on the film.

The principal object of this invention is to provide a high speed camera suitable for use as a gun camera on high performance aircraft as well as for use as a recording device in the research and development of high speed aircraft such as missiles, rockets, and the like.

Conventional aircraft gun cameras are intermittent in operation, i. e. the film is moved to a new frame position and stopped each time a picture is taken. This requires a rather complex film feeding and shutter operating mechanism which limits the operating speed of such cameras to approximately 50 to 60 frames per second. This frame speed is too slow for the photographic work on high speed aircraft. For example, to record the action of a booster rocket when released from a test vehicle or the action of a movable control surface at a critical speed or load condition with any reasonable degree of reliability requires a frame speed two or three times that which is available with the use of conventional gun cameras. Furthermore, such cameras are subject to frequent jamming when acceleration loads of a magntiude normal to high performance aircraft are developed.

Other prior art cameras, such as those employing rotating prisms, are generally unsatisfactory for use on aircraft because of the space requirements and because of their poor operating characteristics under varying load conditions.

Therefore, a second object of this invention is to provide a continuous film motion high frame rate camera having a film feeding sprocket wheel which carries a plurality of light reflecting surfaces on the outer periphery thereof for projecting an image onto a film strip moved by the sprocket wheel wherein optical errors resulting from relative movement between the object image and the film strip, due to such effects as acceleration loads, is eliminated while at the same time permitting the design of a camera capable of operating at speeds in the neighborhood of 500 frames per second and which may be packaged as a small light-weight unit capable of storing and utilizing substantial quantities of film.

Another object of this invention is to provide a continuous film motion high frame rate camera having means whereby the film exposure time may be varied to compensate for different light conditions without also changing the camera frame rate.

Another object of this invention is to provide a continuous film motion, high frame rate camera having means for maintaining the film speed and the image speed at the film surface the same in both sense and magnitude whereby a series of normal images are produced independently of the camera frame rate.

Another object of this invention is to provide a continuous film motion, high frame rate camera which is capable of dependable operation even when subjected to vibration and shock loads and which requires little or no maintenance.

Still another object of this invention is to provide a continuous film motion high frame rate camera having an optical system which is dependent on the stability of the mechanical drive mechanism only for providing the desired frame speed whereby wear and other changing conditions will not impair the ability of the camera to dependably produce a clear image.

Further and other objects will become apparent from a reading of the following description, especially when considered in combination with the accompanying drawing wherein like numerals refer to like parts.

In the drawing:

Figure 1 is a fragmentary sectional side view of the camera with the access door removed;

Figure 2 is a fragmentary sectional top view of the camera;

Figure 3:
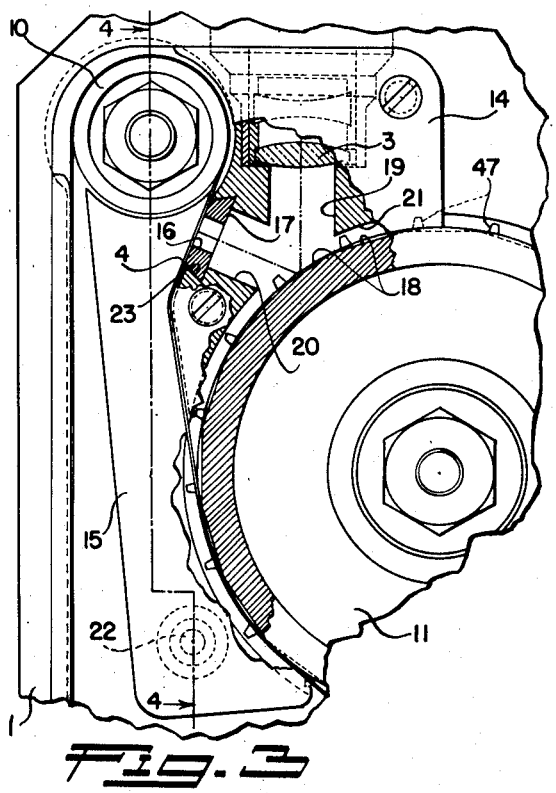
Figure 3 is an enlarged fragmentary side view showing the construction details of the mirror and sprocket wheel and associated optical system.

With particular reference to Figures 1 and 2, it is seen that the camera includes a housing 1 for supporting the optical system and film feeding mechanism within a light-tight enclosure. Housing 1 must be sufficiently rugged to rigidly support the camera optical components under all anticipated loading conditions. The front end 2 of housing 1 securely carries a compound lens 3 having the desired viewing angle for projecting an image of all objects in the camera field of view onto a film strip 4 located within the housing at an optical distance from the lens equal to its focal length. The unexposed portion of film strip 4 is wound on a supply spool 5 located at the rear end 6 of the camera within housing 1. Flm strip 4 is fed from supply spool 5 over a guide roller 7, between a pair of film supporting plates 8 and 9, over a second guide roller 10 located adjacent front end 2 of housing 1, and then along a confined path to effect engagement with a combination mirror and sprocket wheel 11. The film strip, after leaving the combination mirror and sprocket wheel 11 is guided over a pulley 12 and onto a take-up spool 13 which is located between supply spool 5 and the combination mirror and sprocket wheel. As best shown in Figure 2, the supply and take-up spools, as well as wheel 11, are aligned with each other for coplanar rotation about parallel axes to provide a continuous film path, allowing the use of a narrow housing only slightly wider than the strip itself.

Figure 7:
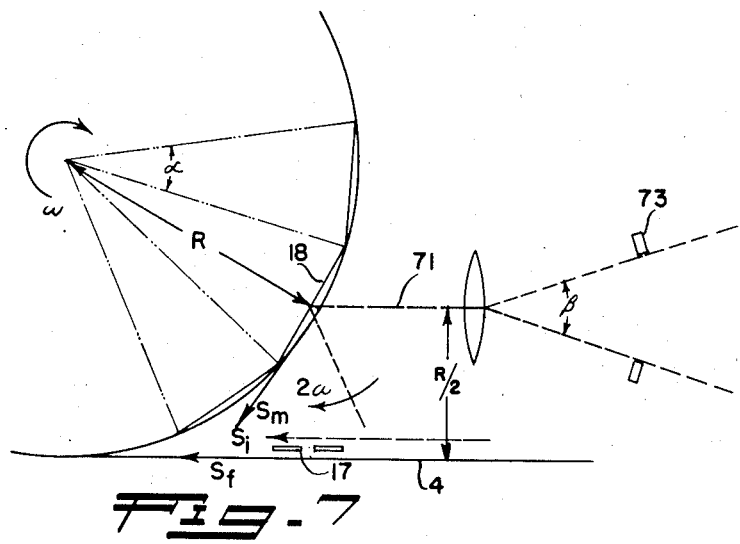
Figure 7 is a schematic diagram illustrating the basic optical system employed by this invention.

As shown in Figures 1 and 3, a fixed guide block 14 and a movable guide block 15 provides the confined path for film strip 4 between guide pulley 10 and wheel 11. These guide blocks position the film so that at a slit 16 in an aperture plate 17, carried by a fixed guide block 14, the film is spaced from the light reflecting mirror segments 18 on wheel 11 an optical distance which is substantially equal to ½ the radius of the wheel, as indicated in Figure 7. When this space relationship between wheel 11 and film strip 4 exists, the film speed and the image speed at the film will be the same in both sense and magnitude. By locating compound lens 3 so that its focal plane is at the surface of the film strip and by moving the image at the same speed as the film, it is obvious that, as the film moves synchronously with the image due to rotation of wheel 11, the film will be exposed with a clear image when it travels through the slit.

In order to obtain proper camera operation it is obviously necessary that the film strip be exposed to light only through slit 16 in aperture plate 17. Therefore, the light entering the camera through lens 3 is directed onto mirror segments 18 at wheel 11 through a tunnel-like passage 19 in fixed guide block 14, as shown in Figures 1 and 3. The light reflected from mirror segments 18 on wheel 11 is directed down a second tunnel-like passage 20 in guide block 14 to expose the film strip only through slit 16 in aperture plate 17. Guide block 14 is shaped to mate with wheel 11 and provide a minimum clearance therebetween to confine the light rays entering the camera through lens 3 to the space provided by passages 19 and 20. Grooves 21 are formed in guide block 14 to accommodate sprockets 47 formed on the wheel.

Aperture plate 17 projects into the film path between the guide blocks and applies a slight pressure on film strip 4 for maintaining a light-tight relationship which will allow exposing only that portion of the film which is uncovered by the slit.

Figure 4:
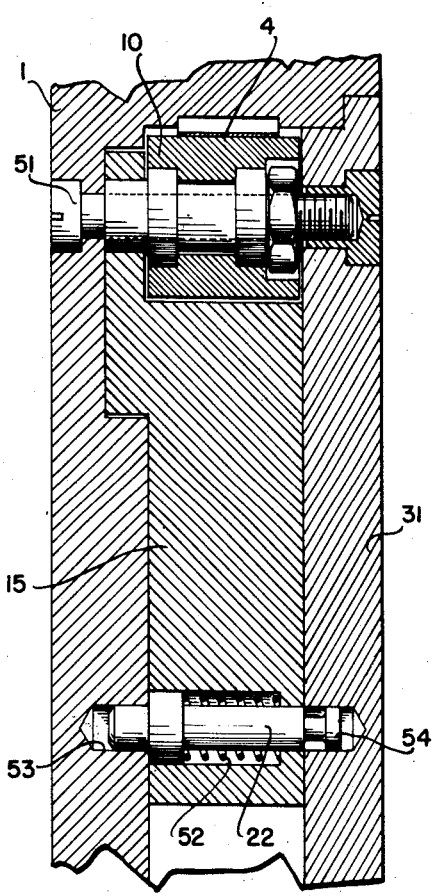
Figure 4 is a sectional view taken on line 4—4 of Figure 3.

Movable guide block 15 is swingably carried by the housing through pin 51, as best shown in Figure 4. A pin 22 is carried by block 15 for locking the latter in the film supporting position effecting positive engagement of sprockets 47 with the film strip. Spring 52, acting between block 15 and pin 22, urges the pin into a hole 53 formed in housing 1 to maintain guide block 15 locked in the operative position shown in Figure 3. To release the guide block it is only necessary to pull on pin 22 at knob 54, which is accessible by removing sideplate 31. This purpose in making guide block 15 movable is to facilitate loading and unloading of the camera and for more conveniently removing aperture plate 16 which is slidably carried in a wedge-shaped groove 23 formed in fixed guide block 14, as best shown in Figures 1 and 3.

Figure 5:
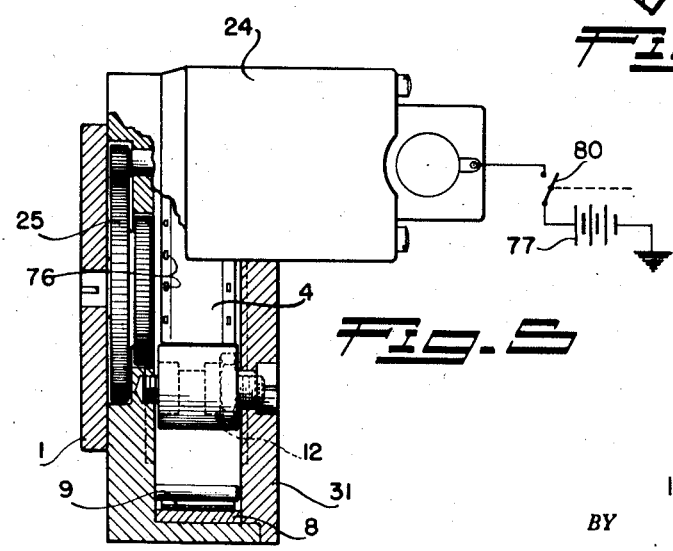
Figure 5 is a sectional view taken on line 5—5 of Figure 1.

Rotation of the combination mirror and sprocket wheel 11 and take-up spool 13 is accomplished by a suitable motor 24 operatively connecting with wheel 11 and spool 13 through a gear train 25. As shown in Figures 1 and 5, the motor is mounted on the outside of housing 1. This configuration effectively isolates the internal camera mechanism and film strip from the motor and allows a small and compact packaging arrangement.

As best shown in Figure 2, motor 24 provides a direct gear connection with wheel 11 while take-up spool 13 is driven through a friction clutch arrangement which will maintain a constant tension load on film strip 4. Actually, the motor need not drive wheel 11 directly to effect proper camera operation. Any suitable drive which will move both the film strip and the wheel in synchronism and at a substantially constant velocity is satisfactory.

In the friction clutch arrangement, gear 26, in gear train 25, is rigidly secured to a shaft 27 which is supported by bearings 28, 29 and 30. Bearing 30 is carried in the removable access door or sideplate 31, while bearings 28 and 29 are carried by the housing itself. Shaft 27 is provided with a transverse flange 32 formed rigid with the shaft and a washer 33 axially movable relative thereto. Washer 33 is prevented from rotating relative to shaft 27 by suitable means, such as keyway 34 formed on opposing sides of the shaft. A brake drum 35 is slidably received by flange 32 and washer 33 on shaft 27 and held in position by radially inwardly directed end walls 38 and 39. Friction washers 36 and 37 are secured to flange 32 and washer 33 respectively for engaging the end walls 38 and 39 on drum 35. Thus by inserting a coil spring 40 between flange 32 and washer 33 friction washers 36 and 37 will be pushed against the end walls of drum 35, urging rotation of the drum in response to rotation of shaft 27 with a force which will remain substantially constant regardless of the magnitude or direction of externally applied loads. End wall 39 is made removable, as indicated in the drawing, to permit assembly and disassembly of the friction clutch. Take-up spool 13 simply slides onto drum 35 and is secured thereto by suitable quick-release means, such as bayonnet fittings 41, so that rotational movement of the drum is transmitted directly to the take-up spool.

Film supply spool 5, which is identical to take-up spool 13, is carried on a shaft 42 provided with a pair of radially outwardly directed flanges 43 and 44 having substantially the same diameter as the outside diameter of drum 35 which supports the take-up spool. Shaft 42 is suitably secured to housing 1 by means of bolts 45 which engage flange 44 and prevent shaft rotation. Supply spool 5 is held in the proper position on shaft 42 by a bearing plate 46 in the sideplate or access door 31. A spool engaging friction spring 75, or the like, may be secured to shaft 42, if necessary, for creating a slight tension load in film strip 4 between spool 5 and wheel 11 to prevent jamming.

The construction of the combination mirror and sprocket wheel 11 is best shown in Figures 2 and 3 wherein two rows of sprockets 47 are located on the outer periphery of the wheel, one on either side of mirror segments 18. The spacing between the sprockets in each row is made to correspond with the standard spacing of the sprocket engaging perforations 76 provided on the particular type of film to be used in the camera, such as 16 mm. film. Mirror segments 18, between the rows of sprockets, are obtained by forming a plurality of equally spaced flat areas in the outer wall of the wheel which may be highly polished for optimum reflective efficiency. To avoid excessive wear of mirror segments 18 the outer peripheral edges 48 and 49 of wheel 11, which carry sprockets 47, are not ground down, but are allowed to remain circular in shape. Thus the only portion of mirror segments 18 which engage film strip 4 are the adjacent ends 50 and slight wear at those points will not be harmful to the quality of the reflected image. Film contact with the mirror segments may be eliminated entirely by chamfering the corners formed by adjacent ends 50.

As schematically illustrated in Figure 7, the magnitude of the angle $\alpha$ subtended by each mirror segment from its axis of rotation represents the upper limit for camera viewing angle $\beta$ using a simple lens. However, this viewing angle may be increased by using a wide angle lens attachment as shown in Figure 1. A veiwing angle $\beta$ less than the angle $\alpha$ may be obtained through the use of an inwardly directed flange 73, or the like, on lens mount 74.

Wheel 11 may be machined out of a single piece of metal or out of several pieces of metal which are later assembled. The latter approach is considered more practical since the mirror segment portion of the wheel requires a hard, non-corrosive metal such as stainless steel, while the sprocket portions of the wheel may be made from such material as aluminum or plastic.

Each photographic frame on the film strip must be centered between adjacent pairs of sprocket engaging perforations on the film in a direction lengthwise of the film in order to use conventional projection apparatus for studying and analyzing the recorded image. Since the critical film path length from the center of slot 16 in aperture plate 17 to the point of initial contact with wheel 11 is different than the length of the arc defined by the outer periphery of wheel 11 from the effective center of the mirror segment causing film exposure to the point of initial film contact, sprockets 47 must be located relative to mirror segments 18 on wheel 11 so as to account for this difference in length if the photographic frames on the film strip are to be properly located relative to the sprocket perforations to permit the use of such conventional projectors. This is readily accomplished, as best shown in Figure 3, wherein the mirror segments instead of being located centrally between adjacent pairs of sprockets are located off the central position a peripheral distance substantially equal to the difference between the critical film path length and the length of the wheel arc as defined above.

In operation, motor 24 rotates combination mirror and sprocket wheel 11 at a predetermined rotational velocity designed in Figure 7 as $\omega$. This will provide a constant peripheral speed $S_m$ for wheel 11 and mirror segments 18 which is, by construction, substantially equal to $S_f$, the speed of film strip 4. Also, when wheel 11 is rotating at an angular or rotational velocity $\omega$, the light rays 71 striking mirror segments 18 will be reflected and caused to move at an angular velocity of $2\omega$ relative to the object being viewed. Therefore, by exposing the film strip to the light rays through slit 16 in aperture plate 17 when the strip is located a distance from the mirror segment producing the reflection equal to substantially one-half the radius of wheel 11, the film speed $S_f$ and the image speed $S_i$ at the film will be equal in both sense and magnitude for producing a sharply defined image.

By selecting an aperture plate having the proper slit width, the correct film exposure time may be obtained for a given frame rate wherein the frame rate is defined as the rotational velocity of wheel 11 multiplied by the number of mirror segments carried thereon.

In order to produce a normal image without double exposure it is essential that the film be exposed by light which is reflected from only one of the mirror segments at a time. This requirement may be met in a specific design by limiting the maximum width of slit 16 in aperture plate 17 or by shifting the position of the slit forwardly of the optical centerline. Normally, the required slit width for proper exposure time is well within the maximum for eliminating double exposures, but when such is not the case the latter procedure of shifting the position of the slit in the aperture plate forwardly of the optical centerline may be used. Double exposure of the film may also be avoided by increasing the spacing between the mirror segments on wheel 11, however this is undesirable since it may decrease both the camera viewing angle and the size of the frames on the film.

To load the camera, sideplate 31 on housing 1 is removed, allowing access to the camera mechanism, as shown in Figure 1. Supply spool 5, carrying unexposed film, is slipped over flanges 43 and 44 on shaft 42 and the end of the film is directed over pulley 7 and between guide plates 8 and 9. Pin 22 is pulled free of housing 1, allowing movable guide block 15 to be swung about the axis of pulley 10 away from guide block 14 and then the film is fed between the guide blocks and over combination mirror and sprocket wheel 11. Finally, the end of the film strip is guided over pulley 12 and secured to take-up spool 13. After loading the film, movable guide block 15 is swung back into the film supporting position and pin 22 is moved into engagement with opening 53 in housing 1, locking guide block 15 in the proper position. If aperture plate 17 should require replacing by a plate having a different slit width this is done before moving guide block 15 into the film supporting position.

After securing camera sideplate 31 to housing 1 to provide a light-tight film enclosure, the camera is ready for use. Of course it must be connected to a suitable source of electrical potential 77, as schematically shown in Figure 5, for energizing the drive motor. Also, as customary with high speed cameras, energization of the camera drive motor by the source of electrical potential should be automatically controlled through suitable switch means 80 to avoid unnecessary use of film.

When the camera drive motor is energized the combination mirror and sprocket wheel is caused to rotate at a substantially constant velocity to impress upon the film strip a series of pictures representing the image of objects within the camera field of view. These series of pictures or frames, produced by exposing the film, are temporarily stored on take-up spool 13 for processing and future use.

Figure 6:
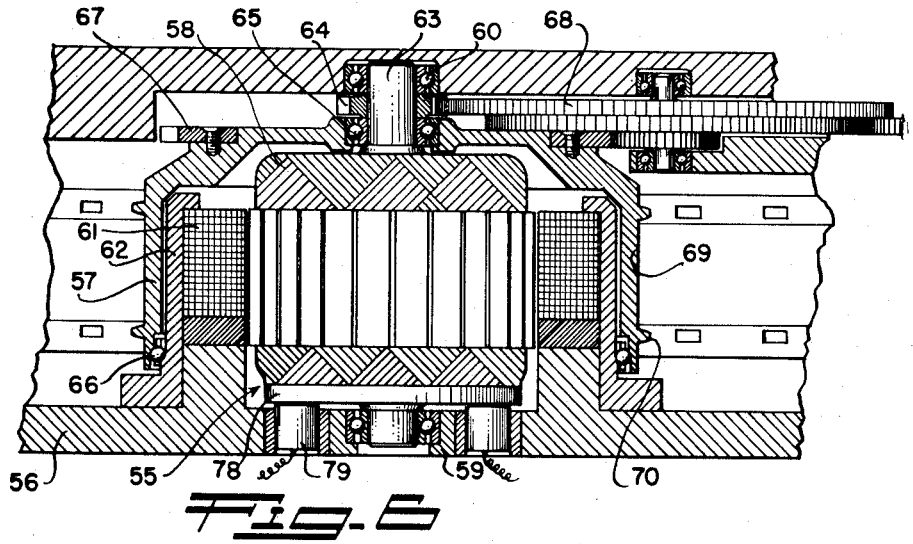
Figure 6 is a sectional view of a modified form of the invention wherein the camera drive motor is mounted inside the film feeding sprocket wheel.

A modified camera construction is shown in Figure 6 wherein the drive motor 55 is carried by housing 56 within combination mirror and sprocket wheel 57. Armature 58 of motor 55 is rotatably carried by the housing through bearings 59 and 60. Stator 61 of the motor is fixedly secured to housing 56 through bracket 62 to effect rotation of armature 58. Shaft 63 on armature 58 carries a driving gear 64 and a combination mirror and sprocket wheel supporting bearing 65. One side of wheel 57 engages bearing 65 and the opposite side engages a bearing 66 on bracket 62 for independent rotation of the wheel relative to armature 58 and housing 56. A ring gear 67, carried on wheel 57, engages a gear train 68, driven by gear 64, to effect rotation of the combination mirror and sprocket wheel. An electrical potential for energizing the motor may be applied to armature 58 through disc type commutator 78 and brushes 79.

The construction of wheel 57 regarding the use of mirror segments 69 and sprockets 70 on the outer periphery thereof is identical to the construction described hereinabove for wheel 11 in Figures 1, 2 and 3. Likewise, the film strip feed mechanism and the optical system may be the same as that employed in the principal configuration.

By mounting the camera drive motor inside the combination mirror and sprocket wheel, the overall dimensions of the camera may be made even smaller than with the configuration wherein the drive motor is mounted outside the housing. In camera applications where power requirements are reasonable and space is a critical factor, the modified version may be preferable.

While the camera has been shown and described in considerable detail it is to be understood that certain alterations, modifications and substitutions may be made thereto without departing from the spirit and scope of this invention as defined by the appended claims.

I claim:

1. A continuous film motion camera comprising, a housing forming an enclosure, a light sensitive film strip carried within said housing, said strip having a plurality of equally spaced perforations formed therein, a wheel rotatably carried by said housing within said enclosure, a plurality of generally flat mirror segments located on the outer periphery of the wheel, an opening formed in said housing, lens means carried by said housing within said opening for directing light representing an image of an object within the camera field of view onto said mirror segments, a plurality of sprockets carried on the outer periphery of said wheel for engaging the perforations in said film strip and moving the latter along at the peripheral speed of the wheel, said sprockets on said wheel being arranged relative to said mirror segments so as to locate the image reflected onto the film strip from each mirror segment centrally between adjacent sprocket engaging perforations in a direction lengthwise of the film, film guide means carried by said housing and shielding said film strip from stray light, an aperture plate carried by said guide means and having a slit formed therein through which light reflected from only one of said mirror segments at a time may be directed onto said film, said guide means at said aperture plate maintaining the optical spacing between the mirror segments and the film substantially equal to half the radius of the film wheel whereby the film speed and the image speed at the film is substantially the same in both sense and magnitude, friction means carried by said housing and maintaining the film strip under a substantially constant tension load and in engagement with said sprocket on said wheel regardless of the magnitude or direction of the external loads applied to the housing, said friction means including a film strip brake drum, said drum having a pair of end walls, a shaft extending axially through said drum, a pair of disc type brake shoes carried on said shaft within said drum, at least one of said shoes being axially movable relative to said shaft, and a coil spring concentrically arranged on said shaft between said brake shoes and urging the latter apart to engage the end walls of the drum and exert a braking force between the drum and shaft, and drive means carried by said housing for rotating both said shaft and wheel at a substantially constant velocity.

2. A high frame rate continuous film motion camera comprising a housing forming an enclosure, a wheel carried by said housing within said enclosure, said wheel having a plurality of generally flat mirror segments formed on the outer periphery thereof, a light-sensitive film strip carried within said housing, an aperture plate carried by said housing, said aperture plate having a slot formed therein through which light rays may be reflected by only one of said mirror segments at a time, lens means carried by said camera and arranged to direct light representing an image onto said mirror segments, sprocket means carried on said wheel for engaging said film strip and moving the same along at the peripheral velocity of the wheel, a film guide block carried by said housing and providing a continuous support for said film strip from said aperture plate to said wheel whereby the length of film from the aperture plate to the wheel is substantially constant under all operating conditions, said guide block having one end thereof curved to mate with said wheel and provide sufficient clearance to accommodate the film strip only when it is in engagement with said sprockets, drive means carried by said housing for rotating said wheel to expose said film strip to light rays representing a series of normal images reflected off said mirror segments, a brake drum on which the exposed film strip may be rolled, said drum having a pair of end walls, a shaft extending axially through said drum and connecting with said drive means for rotation with said wheel, a pair of disc type brake shoes carried on said shaft within said drum, at least one of said shoes being axially movable relative to said shaft, and a coil spring concentrically arranged on said shaft between said brake shoes and urging the latter apart to engage the end walls of the drum and exert a substantially constant braking force between the drum and shaft.

References Cited in the file of this patent

UNITED STATES PATENTS

| | | |
|---|---|---|
| 1,575,133 | Steigman | Mar. 2, 1926 |
| 1,613,730 | Steigman | Jan. 11, 1927 |
| 1,655,298 | Thornton | Jan. 3, 1928 |
| 1,716,990 | Thornton | June 11, 1929 |
| 1,760,220 | Thornton | May 27, 1930 |
| 1,980,915 | Graser | Nov. 13, 1934 |
| 2,114,608 | Ross | Apr. 19, 1938 |
| 2,127,143 | Ross | Aug. 16, 1938 |
| 2,142,493 | Carpenter | Jan. 3, 1939 |
| 2,163,179 | Porter | June 20, 1939 |
| 2,340,564 | Riedel | Feb. 1, 1944 |
| 2,440,797 | Clough | May 4, 1948 |

FOREIGN PATENTS

| | | |
|---|---|---|
| 361,078 | France | May 16, 1906 |
| 463,275 | France | Dec. 12, 1913 |
| 443,537 | Great Britain | Mar. 2, 1936 |